United States Patent Office 3,282,911
Patented Nov. 1, 1966

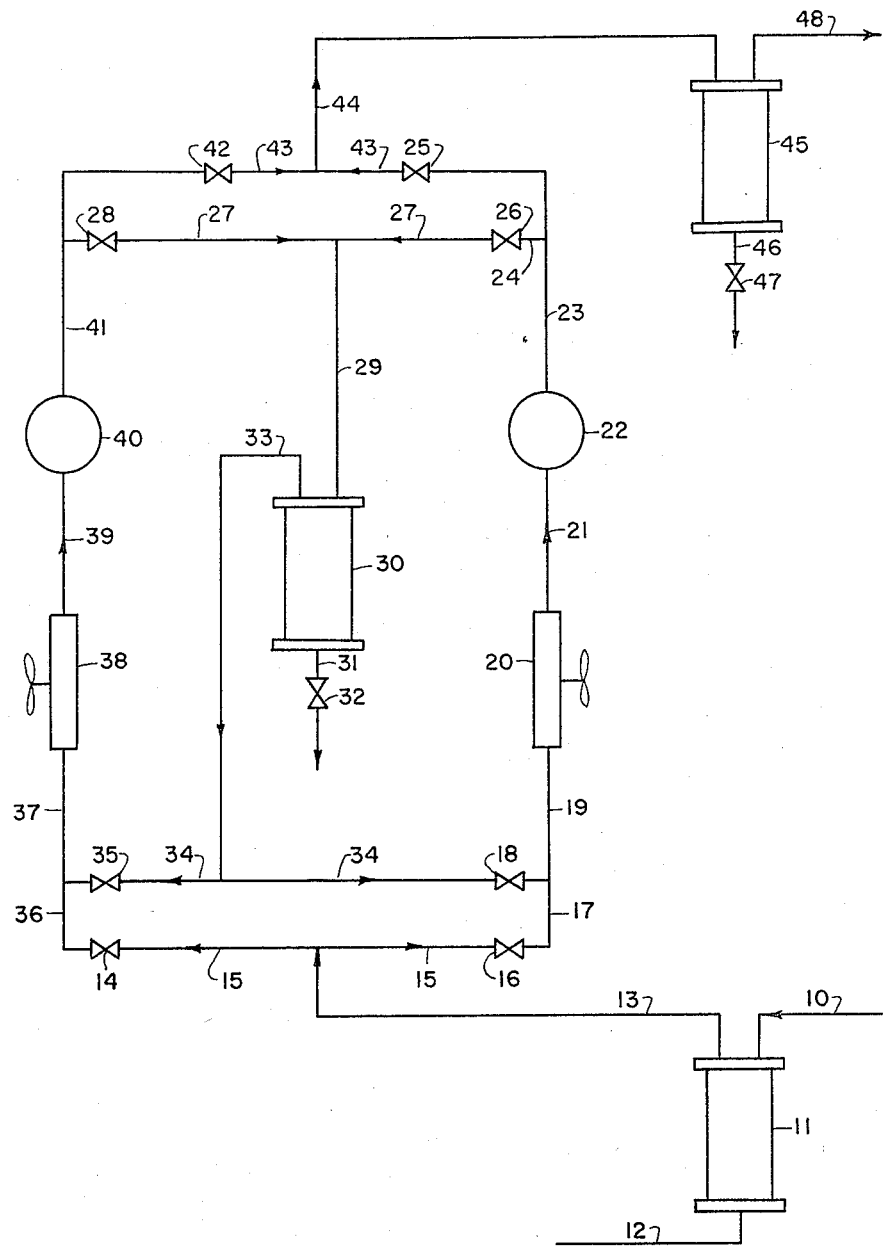

3,282,911
PROCESS FOR TREATING ETHYLENE
RECYCLE STREAMS
Michael Erchak, Jr., Ridgewood, N.J., assignor to Rexall Drug and Chemical Company, Los Angeles, Calif., a corporation of Delaware
Filed Aug. 8, 1962, Ser. No. 215,707
4 Claims. (Cl. 260—94.9)

This invention relates to a process for treating ethylene recycle streams in an ethylene polymerization process and it more particularly relates to a method of treating an unreacted ethylene stream containing small quantities of low molecular weight polyethylenes commonly referred to as wax. This wax at ambient temperature consists of materials ranging from a thin oil to a fairly hard wax and due to the high temperature of the unreacted ethylene is carried along dissolved and/or entrained therein. It is essential in ethylene manufacture wherein a stream containing such waxes or condensable constituents dissolved and/or entrained in the stream that they be removed therefrom prior to recycle of ethylene for further polymerization or otherwise.

When ethylene is polymerized at pressures ranging from 15,000 or below to 45,000 and above and temperatures of 225 to 600° F. the reaction mixture resulting from polymerization comprises high molecular weight polyethylene which is referred to as low density polyethylene, waxy or condensable constituents unreacted ethylene, comonomers, solvents or diluents and modifiers when such are employed in the process. The reaction mixture from the high pressure reactor is reduced in pressure and the unreacted ethylene and the molten polymer are separated in an appropriate high pressure separator. For economical realization of polymerization processes of this nature unreacted gases should be recycled after their separation by recycling them to compressors with fresh ethylene and reintroduction to a pressure resistant reactor.

In ethylene polymerization reactions involving the use of high pressures wherein low density or "conventional" polyethylene is obtained it is known to recycle unreacted ethylene and it is further known to recycle ethylene at elevated pressures usually to one or more stages of the compression equipment employed. All traces of condensable reaction products whether they be solid, semi-solid waxes or liquid polymers of low molecular weight or even gaseous polymers carried along or dissolved in a recycle stream must be substantially completely removed therefrom before it is brought back again to the reaction pressure. The dissolved and/or entrained reaction products in a recycle stream which can amount to usually a fraction of a percent or at most a few percent of this stream (hereinafter denoted as condensable constituents) can have the form of extremely fine particles such as dust or be in liquid droplets or even in a gaseous phase. Also in some instances the recycle stream includes some dissolved compressor lubricants such as oils and these should also be removed.

It is an object of this invention to provide a process for removing dissolved and/or entrained condensable constituents from an ethylene recycle stream in an ethylene polymerization process.

It is a further object of this invention to provide an economic system for treating ethylene recycle streams to remove condensable constituents therefrom which eliminates the necessity of removing deposits of condensable constituents with extraneous solvents therefor from apparatus employed in the processing.

Further objects of this invention will be realized from the specification and the attached drawing as the invention is more fully described hereinafter.

According to this invention there is provided a continuous cycling process for removing entrained condensable constituents from an ethylene recycle stream in an ethylene polymerization process wherein at least two condensing zones are preferably arranged in parallel and wherein an ethylene recycle stream in a heating cycle is introduced to contact a first condensing zone in order to remove, such as by melting, condensed waxes from a previous cooling cycle, and then led in a cooling cycle to contact a second condensing zone wherein condensable constituents are caused to deposit on the cooling surfaces of the condensing zone. The invention further contemplates the continuous reversing of the flow of the ethylene recycle stream so that the condensing zones are alternately heated and cooled in a continuous cycling process as will be described henceforth. The invention in a further aspect contemplates changing the velocity and direction of recycle ethylene flow between heating and cooling cycles to aid in removing condensable constituents from ethylene ladened with such and taken from a heating cycle.

The ethylene recycle streams treated according to the process of this invention are after such treatment substantially free of dissolved and/or entrained condensable constituents. The condensible constituents that is the oily or waxy materials are usually present in such recycle streams prior to removal therefrom, in finely divided form, that is a very fine mist and it is difficult to remove them therefrom. For example, an ordinary filter does not efficiently remove these fine misty particles from such a recycle stream, and, according to this invention, they are removed by exposing them to contact on large cooling surfaces such as coils on heat exchangers as will be described herein.

Reference is made to the attached drawing, which is incorporated herein as a part of this invention, to demonstrate a suitable arrangement of the processing apparatus for carrying out the techniques of this invention.

In the drawing, line 10 illustrates a reactor effluent containing polymerized and unpolymerized ethylene which is led to a separator 11 wherein molten polymer is separated via line 12 and led elsewhere for treatment and unreacted ethylene is taken via line 13 for processing according to this invention. The ethylene recycle stream composition in line 13 comprises unreacted ethylene and small amounts of condensable constituents which must be recovered from the stream prior to its recycle to a high pressure reactor as is known in the art. With valve 14 closed and valve 16 open the ethylene recycle is led through line 15, line 17 and the condensing zone denoted generally as A. Valve 18 is closed so that the recycle stream flows to contact two condensing units 20 and 22 arranged in series in condensing zone or bank A. Condensing unit 20 is a fan type cooler while condensing unit 22 is an ordinary heat exchanger. Both units 20 and 22 contain deposited waxy material or condensable constituents from a prior cooling cycle. The ethylene recycle stream in the cycle being described is in a heating cycle, that is, it comes directly from the high pressure separator at elevated temperatures and contacts the surfaces in condensing zones 20 and 22 containing the deposited constituents, melts them and carries them in the stream through line 21 from condenser 20 and through line 23 from condenser 22. Line 24 leads to valve 26 which is open and thence through line 27 to line 29. Valve 28 is closed so that the recycle stream is carried through an enclosed zone or hot trap denoted as 30 where the velocity of ethylene is reduced and a change in its direction of flow causes deposition of condensable constituents entrained in the stream and taken from condensing zone A in its heating cycle passage. The condensed constituents in enclosed zone 30 are taken via line 31 and valve 32 for further disposal. The ethylene recycle stream is taken through line 33 to line 34 and with valve 35 open to line 36 and line 37 prior to contacting the condensing zone denoted generally as B. Condensing zones A and B form the preferred parallel arrangement alluded heretofore. In condensing zone B two units are arranged in series in the same manner as in condensing zone A. Units 38 and 40 which can be heat exchangers, for example 38 being a fan type cooling unit, while unit 40 can be a heat exchanger of the ordinary type wherein cooling water or steam can be used depending on whether a hot or cold cycle is being used. Since the ethylene recycle stream has passed through a hot cycle in condensing zone A and has removed waxes from said zone it is now taken to a cooling cycle with reference to condensing zone B, that is both units 38 and 40 are at a temperature below the temperature of the recycle stream so that entrained constituents not removed in enclosed zone 30 are condensed in this zone. The ethylene stripped of most of its condensable waxes after appropriate contact with units 38 and 40, is taken via line 41, valve 28 being closed and valve 42 being open, through lines 43 and 44 prior to contacting a final enclosed zone for further removal if any of entrained condensable material not removed by zone B. In enclosed zone 45 the ethylene is again caused to change its velocity to a lower value and its direction of flow so that condensable constituents are separated therefrom and deposited in the zone which is, in reality, a cold trap. The condensed constituents in zone 45 are removed via line 46 and valve 47. The ethylene stream substantially completely free of condensable constituents is thereafter taken via line 48 and if desired through appropriate filters prior to introduction to a suitable reactor.

The above describes the preferred method of treating an ethylene recycle stream during the first phase of treatment, that is the "hot cycle" phase through condensing zone A and the "cooling cycle" phase through condensing zone B. Condensing zone B after this first phase of treatment of ethylene will accumulate considerable deposits on the surface by virtue of its cooling of the recycle stream. In order to remove these deposits from this unit it must be treated in a hot cycle as described for condensing zone A. To do this the hot ethylene recycle stream is reversed in flow, that is it is taken through line 15, valve 14 being open, valves 16 and 35 being closed, through line 37, condensing unit 38, line 39, condensing unit 40 and line 41. Valves 42 and 26 are closed and valve 28 is open so the recycle stream flows through line 27 to line 29. From line 29 the ethylene stream is again reduced in velocity and its direction of flow changed by taking it to enclosed zone or hot trap 30 and led through lines 33 and 34. Valve 18 is open and valve 35 is closed so the recycle stream flows via line 19 to condensing zone A which was previously in the heating phase and is now substantially free of deposits of condensable constituents. Units 20 and 22 are cooled during this cooling cycle by appropriate means to a temperature lower than the recycle stream line 19 to cause the deposition of condensable constituents from the stream. Thus after contact with units 20 and 22 the recycle stream is taken through line 23, valve 26 being closed, valve 25 being open and line 43, valve 42 being closed and line 44 to enclosed zone or cold trap 45. In enclosed zone 45 the recycle stream is again reduced in velocity and its direction of flow changed so that if any condensable constituents remain, they are deposited in this zone. The recycle stream can thereafter be led through line 48, through suitable filters if desired prior to introduction to a high pressure polymerization reactor. The processing of the recycle stream continues as above and the flow of the ethylene stream is changed from condensing zone A to condensing zone B alternately and continuously as described. It will be appreciated that this process is highly efficient since it is unnecessary to dissolve the constituents in condensing zones A and B with extraneous solvents for the constituents and the recycle stream is used to effect this treatment.

Although condensing zones A and B have been described with reference to two units each, 20 and 22, and 38 and 40, it is obvious that one or more than two such condensing apparatus can be employed in series. The condensing units per se can be of a variety of types such as ordinary heat exchangers, air cooled heat exchangers, etc. so long as the object of removing condensable constituents from a recycle stream is accomplished. The provision of the enclosed hot and cold traps 30 and 45 aids in knocking out or removing entrained waxy materials from the recycle stream by virtue of its change in velocity and direction of flow. Essentially these zones are of a larger cross-section than the lines conveying the recycle ethylene and by virtue of the resulting enlarged volume the speed or velocity of the recycle stream is changed to a lower value. This change in velocity plus the change in direction of flow provides the stream with adequate contact time within the enclosed zone to deposit entrained materials. In zone 30, the hot trap, the temperature of the ethylene is higher than the temperature of the ethylene in zone 45, the cold trap. Thus in hot trap 30 some, but not all, of the entrained constituents will be deposited at the temperature therein while in the cold trap 45 substantially complete removal of the waxy materials, if any, is finally obtained. If minute dust particles (essentially low molecular weight polymers) remain after contact with zone 45 filters can be used to aid further in separating them from the recycle stream prior to leading it to the high pressure reactor.

The drawing illustrating the above arrangement of apparatus represents the preferred method of operation in accordance with this invention. As illustrated, the two sets or banks are so arranged so that hot ethylene gas from the high pressure separator can flow through either set of heat exchangers first and then through the other set. Normally the hot ethylene gas will first pass through the set that is fouled with wax and then through the clean set. The first set that it passes through will not have cooling water or other cooling medium circulating through it so that the hot gas will melt the wax out of the tubes. In the second set or bank of heat exchangers arranged in series the ethylene gas is first cooled with water or any desired cooling medium and the wax condensed by this cooling is removed in the hot trap. The ethylene gas is then further cooled in a cooling cycle by two heat exchangers in series. The ethylene gas then passes through a cold trap where condensable wax is removed by reduction in velocity and change in direction. The wax is drawn off of the bottom of the two traps periodically and disposed of in any suitable manner.

In the process of this invention, when a set of heat exchangers becomes fouled by solidification of wax and sufficient cooling can no longer be obtained or the pressure drop through the set has become too great its position in the system is switched and the set that has been thawing out is put in cooling service.

Thus in the above under normal conditions one bank will have a coating of wax in the tube walls which must be removed, therefore a stream of hot ethylene gas will pass through this bank without the use of cooling water so that dewaxing will be accomplished. The hot ethylene gas stream will then pass through the alternate bank of coolers which will be supplied with cooling water. When the bank doing the cooling part of the operation begins to plug with wax the system is changed so that hot ethylene gas will then dewax this bank and the bank that has been being dewaxed will be used for cooling.

In a high pressure process for manufacture of low density polyethylene the reactor effluent is usually discharged into a high pressure resistant vessel at temperatures above about 375 and up to 600°, preferably between about 450 to 550° F. The pressure drop is from reaction pressures of above about 15,000 p.s.i. to preferably above 1000 p.s.i. in the high pressure separator. Usually, the pressure of the effluent reaction products from the reactor in the high pressure separator is in the range of 1000 to 4500 p.s.i. but can be higher, for example up to 6000 p.s.i. The unreacted ethylene, for reasons of economy, is recycled at these pressures through the dewaxing process of this invention and then to compressors where the pressure is boosted to the desired level.

In its passage through the dewaxing section of this invention the ethylene recycle stream is cooled in the cooling cycle to an appropriate level, concomitant with compressor operation temperatures. According to the process described herein, the ethylene recycle stream is cooled to a temperature of from about 50 to 100° F., preferably about 60 to 70° F. prior to recycle to the compressors. Lower cooling temperatures, that is, 40° F. or below can also be used. It will thus be appreciated that at this relatively low temperature, substantially all waxy constituents are deposited on the cooling surfaces or coils of the particular cooling or condensing zone in question. During the heating cycle, ethylene gas at the temperature in the high pressure vessel, that is, above 400° F. or thereabout, is sufficiently high to melt any waxy constituents previously deposited in the zone of passage.

EXAMPLE

During ethylene polymerization in a high pressure process, the major part of the polymer formed was separated from unreacted ethylene in a high pressure vessel maintained at a pressure of about 4000 to 4500 p.s.i. and a temperature of about 525 to 550° F. Analysis showed that the amount of waxy condensable constituents in an ethylene recycle stream from this operation amounted to from 0.15 to 0.30 pound per 100 pounds of polyethylene manufactured. By employing the process of this invention as herein described the waxy condensable constituents were substantially completely removed from the ethylene recycle streams very consistently so that only ethylene comonomer and modifier was recycled to the high pressure reactor for further polymerization.

The process of this invention is applicable to dewaxing of ethylene recycle streams in a high pressure ethylene polymerization system and includes dewaxing of such stream whether the polymerization is a homo or copolymerization reaction. Thus comonomers can be introduced to the reaction such as propylene, butene-1, isobutylene, hexene-1, vinyl acetate, or any of a large number of such copolymerizable constituents known in the art. Also modifiers or chain transfer agents such as propane, butane, hexane, cyclohexane, alcohols, ketones, aldehydes or any of a large number of such modifiers known in the art. Diluents such as water or aromatics can also be employed in the process of this invention as is known in the art for polymerizing ethylene at high pressures.

While this invention has been described with reference to preferred embodiments herein, modifications can be incorporated in the arrangement of the various units described as well as the numbers of units employed without departing from the inventive concept as defined in the herein appended claims.

What is claimed is:

1. In a process for removing small quantities of condensable constituents from an ethylene recycle stream in a high pressure ethylene polymerization process, the improvement involving continuous heating and cooling cycles which comprises the steps of:
    (a) removing and entraining condensable constituents deposited on a condensing surface from a prior cooling cycle with said ethylene recycle stream at a temperature in the range of about 375° to 600° F. during a heating cycle,
    (b) reducing the velocity of said ethylene stream from said heating cycle and removing a portion of the entrained condensable constituents in said ethylene stream in an enclosed zone,
    (c) cooling the ethylene stream from said enclosed zone and depositing further entrained condensable constituents onto another condensing surface during a cooling cycle, and
    (d) reversing the flow of said ethylene recycle stream from the first mentioned condensing surface to the second mentioned condensing surface and repeating the steps of (a), (b), and (c).

2. The process of claim 1 wherein the ethylene recycle stream from said cooling cycle is introduced into a second enclosed zone, wherein its velocity is reduced and its direction of flow is changed, and wherein further condensable constituents, if any, are removed therefrom.

3. The process of claim 1 wherein the ethylene recycle stream is maintained at a pressure in the range of about 1000 to 6000 pounds per square inch.

4. The process of claim 1 wherein the ethylene recycle stream during said heating cycle is at a temperature in the range of about 450° to 550° F.

References Cited by the Examiner

UNITED STATES PATENTS

| | | | |
|---|---|---|---|
| 2,762,449 | 9/1956 | Sweeney | 55—222 |
| 3,081,290 | 3/1963 | Cottle | 260—94.9 |

FOREIGN PATENTS

| | | |
|---|---|---|
| 777,197 | 6/1957 | Great Britain. |

JOSEPH L. SCHOFER, *Primary Examiner.*

F. L. DENSON, *Assistant Examiner.*